(12) United States Patent
Wang et al.

(10) Patent No.: US 7,300,536 B1
(45) Date of Patent: Nov. 27, 2007

(54) METHOD FOR ATTACHING INTERSECTING TUBES

(75) Inventors: Pei-Chung Wang, Troy, MI (US); John D. Fickes, Brighton, MI (US); Charles J. Bruggemann, Rochester Hills, MI (US); Sanjay M. Shah, Troy, MI (US); Joseph M. Lendway, IV, Dryden, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/430,350

(22) Filed: May 9, 2006

(51) Int. Cl.
*B29C 65/00* (2006.01)
(52) U.S. Cl. .............................. 156/274.8; 156/274.4; 156/293; 296/203
(58) Field of Classification Search ............. 156/272.2, 156/273.9, 274.4, 274.8, 275.5, 275.7, 293, 156/296, 294; 403/272; 29/469.5, 505; 285/915; 296/203
See application file for complete search history.

(56) References Cited

U.S. PATENT DOCUMENTS

| | | | | |
|---|---|---|---|---|
| 1,292,812 A | * | 1/1919 | Lachman ................... 219/107 |
| 3,828,412 A | * | 8/1974 | Dreksler ................ 29/890.035 |
| 4,887,849 A | * | 12/1989 | Briet ............................ 285/91 |
| 5,581,868 A | * | 12/1996 | Bisch ....................... 29/525.08 |
| 6,255,631 B1 | * | 7/2001 | Kichline et al. ............ 219/617 |
| 6,640,517 B2 | * | 11/2003 | Mitchell ..................... 52/736.1 |
| 6,953,147 B2 | * | 10/2005 | Ananthanarayanan et al. .......................... 228/245 |
| 2004/0056001 A1 | * | 3/2004 | Ananthanarayanan et al. .......................... 219/59.1 |
| 2005/0193545 A1 | * | 9/2005 | Kiehl .......................... 29/505 |
| 2006/0214418 A1 | * | 9/2006 | Pascuzzi et al. ........... 285/21.1 |

* cited by examiner

*Primary Examiner*—Jeff H. Aftergut
*Assistant Examiner*—Daniel McNally

(57) ABSTRACT

A method is provided for attaching together a larger tube and a smaller tube in a T-shaped intersecting joint. A hole is formed in the larger tube with a flange surrounding the hole. A circumferential extending flange is formed on the outside of the smaller tube. Adhesive is placed on either the outside of the smaller tube or the inside of the flange of the larger tube. The smaller tube is inserted into the hole in the larger tube so that the adhesive is interposed between the inside of the flange of the larger tube and the outside of the smaller tube and the flange on the outside of the smaller tube comes into electrical conducting contact with the flange of the larger tube. Electrical current is applied to flow between the large tube and the small tube so that electrical resistance heating is obtained to cure the adhesive.

14 Claims, 3 Drawing Sheets

METHOD FOR ATTACHING INTERSECTING TUBES

FIELD OF THE INVENTION

The present invention relates to a method for attaching tubes that intersect one another in a T-shaped joint.

BACKGROUND OF THE INVENTION

It is known in the manufacture of motor vehicles and other articles of manufacture to attach together a pair of tubes that meet each other at a right angle or an acute angle to form a T-shaped joint. The tubes are butted together and then attached by conventional welding processes, for example by spot welding or other fusion welding processes. In other cases, one of the tubes can have a hole provided therein for receiving an end of the other tube, and then the conventional welding process is employed. The welding together of tubes in this manner is especially challenging in the case of relatively thin walled tubes where the application of heat during the welding process may cause distortion of one or both of the tubes.

SUMMARY OF THE INVENTION

A method is provided for attaching together a larger tube and a smaller tube in a T-shaped intersecting joint. A hole is formed in the larger tube with a flange surrounding the hole. A circumferential extending flange is formed on the outside of the smaller tube. Adhesive is placed on either the outside of the smaller tube or the inside of the flange of the larger tube. The smaller tube is inserted into the hole in the larger tube so that the adhesive is interposed between the inside of the flange of the larger tube and the outside of the smaller tube and the flange on the outside of the smaller tube comes into electrical conducting contact with the flange of the larger tube. Electrical current is applied to flow between the large tube and the small tube so that electrical resistance heating is obtained to cure the adhesive.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 6:
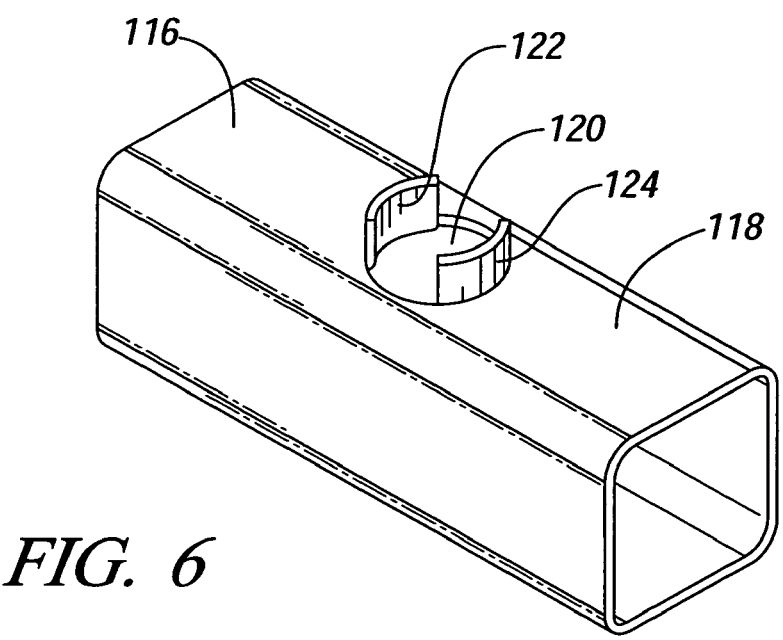

and, FIG. 6 is a perspective view of another embodiment of the invention.

DETAILED DESCRIPTION OF THE EXEMPLARY EMBODIMENTS

The following description of certain exemplary embodiments is merely exemplary in nature and is no intended to limit the invention, its application, or uses.

Figure 1:
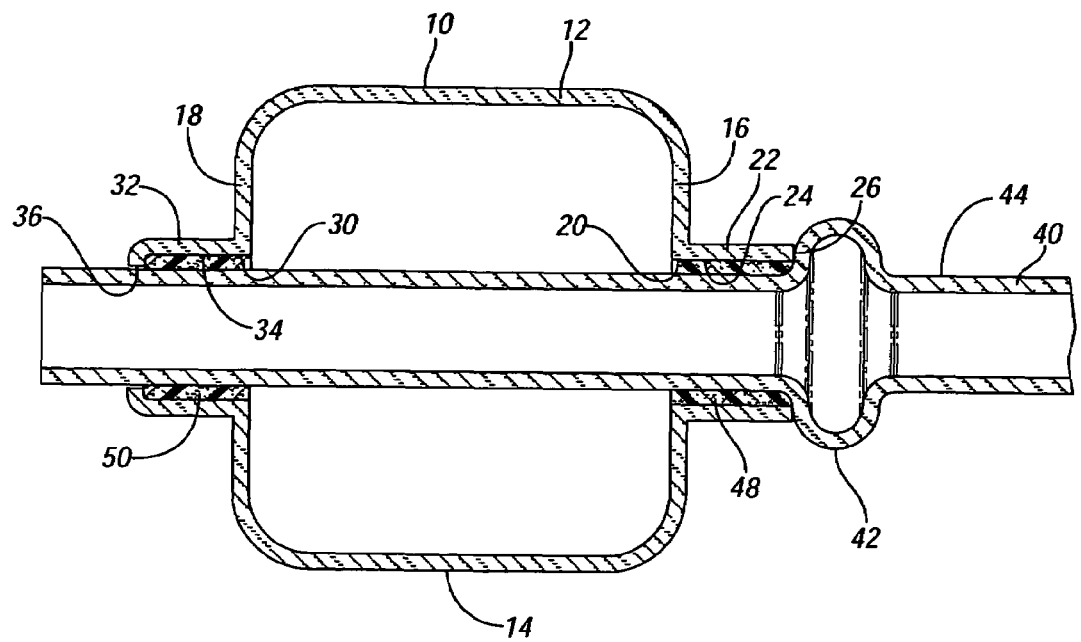
FIG. 1 is a section view taken through a pair of intersecting tubes that are adhesively attached together.

Referring to FIG. 1, a large square tube 10 includes a top wall 12, bottom wall 14, and opposed and spaced apart side walls 16 and 18. An inlet hole 20 is formed in the side wall 16 and is surrounded by a flange 22 that defines an inner flange surface 24 and has an end wall 26. The hole 20 and its flange 22 are formed in the tube using any of the known tube forming processes, such as hydroforming, bulge forming, or T-drilling. Examples of hydroforming and bulge forming are well known in the prior art. The T-drilling process is performed using equipment provided by T-Drill Industries, Inc, Norcross Ga.

Large tube 10 also has an outlet hole 30 that is surrounded by a flange 32 having an inner flange surface 34. The end wall 36 of the flange 32 is turned inwardly, as will be discussed further hereinafter.

FIG. 1 also shows a small round tube 40 that is sized to be inserted through the aligned openings 20 and 30 of the side walls 16 and 18 of the large tube 10. A circumferential flange 42 is formed on the small tube 40 and extends outwardly from the outside surface 44 of the small tube 40. As seen in FIG. 1, the insertion of the small tube 40 through the holes 20 and 30 of the large tube 10 will be stopped by the engagement of the flange 42 with the end wall 26 of the flange 22. In addition, FIG. 1 shows that the inturned end wall 36 of the flange portion 32 surrounding the outlet hole 30 is turned inwardly from that part of the flange portion 32 that extends coaxially with the small tube 40, so that the inturned end wall 36 is in close contacting engagement with the outside surface 44 of the small tube 40.

As seen in FIG. 1, adhesive is used to attach the small tube 40 to the large tube 10. In particular, an annular ring of adhesive 48 is interposed between the outer surface 44 of the small tube 40 and the inner flange surface 24 of the flange portion 22. This adhesive may be applied onto the outer surface 44 of the small tube 40 prior to the insertion of the small tube 40, or in the alternative, this adhesive 48 may be applied to the inner flange surface 24 prior to the insertion of the small tube. Likewise an annular ring of adhesive 50 is interposed between the outer surface 44 of the small tube 40 and the inner flange surface 34 of the flange portion 32. This adhesive 50 may be applied onto the outer surface 44 of the small tube 40 prior to the insertion of the small tube 40, or in the alternative, this adhesive 50 may be applied to the inner flange surface 34 of the flange 32 prior to the insertion of the small tube 40. The adhesive may be applied as a liquid or as a pre-formed adhesive ring.

The adhesive is at least partially cured by electrical resistance heating of the adhesive. Electrodes, not shown in FIG. 1, are applied to the large tube 10 and to the small tube 40. When electrical current is introduced, the current will be conducted between the tubes at the line of contact between the flange 42 of the small tube 40 and the end wall 26 of the flange 22 of the large tube 10, an thereby cause electrical resistance heating of the tubes in the region of the flange 22 and adhesive 48 to cure the adhesive. In addition current will be conducted between the tubes at the line of contact between the interned end wall 36 of the flange 32 of the large tube 10 and the outer surface 44 of the small tube 40, and thereby cause electrical resistance heating of the tubes in the region of flange 32 and adhesive 50 to cure the adhesive 50.

Further and final curing of the adhesive 48 and 50 may occur subsequently in an oven, for example, in the case of automobile manufacture, a paint curing oven.

A second example of the invention is shown in FIGS. 2-5. A large tube 70 includes a top wall 72, bottom wall 74, and side walls 76 and 78. A hole 80 is formed in the top wall 72 and is surrounded by a flange 82 that defines an inner flange surface 84 and has an end wall 86. The hole 80 and its flange 82 are formed in the tube using any of the known tube forming processes, such as hydroforming, bulge forming, or T-drilling.

Figure 2:
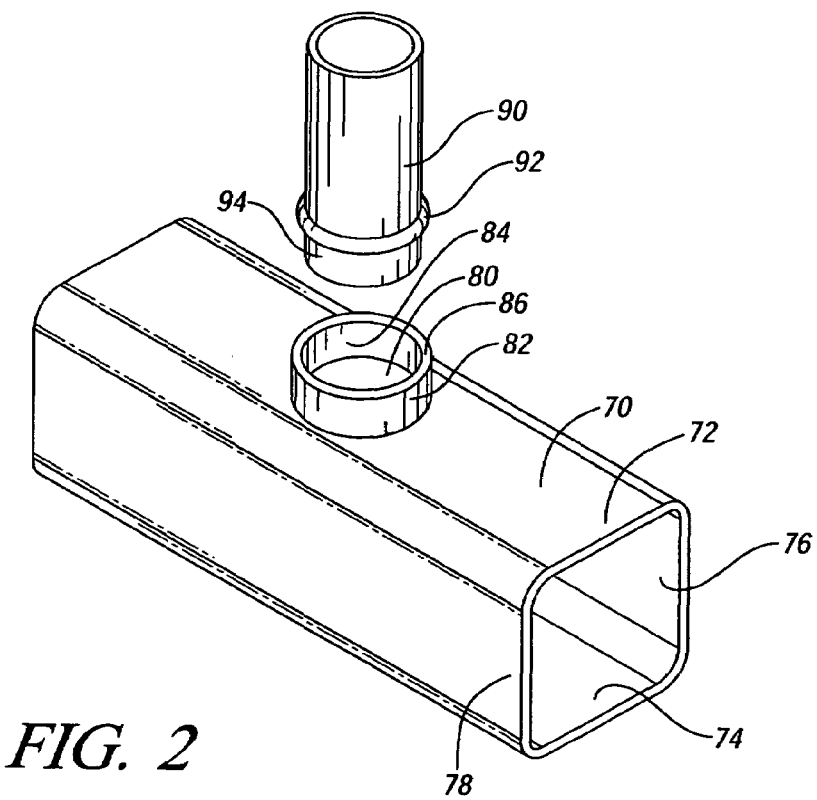
FIG. 2 is a perspective view of a second embodiment of the invention showing a smaller tube poised for insertion into the flanged opening of a larger tube.

FIG. 2 also shows a small round tube 90 that is sized to be inserted into the hole 80 of the large tube 70. A circumferential flange 92 is formed on the small tube 90 and extends outwardly from the outside surface 94 of the small tube 90. As seen in FIG. 1, the insertion of the small tube 90 through the hole 80 of the large tube 70 will be stopped by the engagement of the flange 92 with the end wall 86 of the flange 82.

Figure 3:
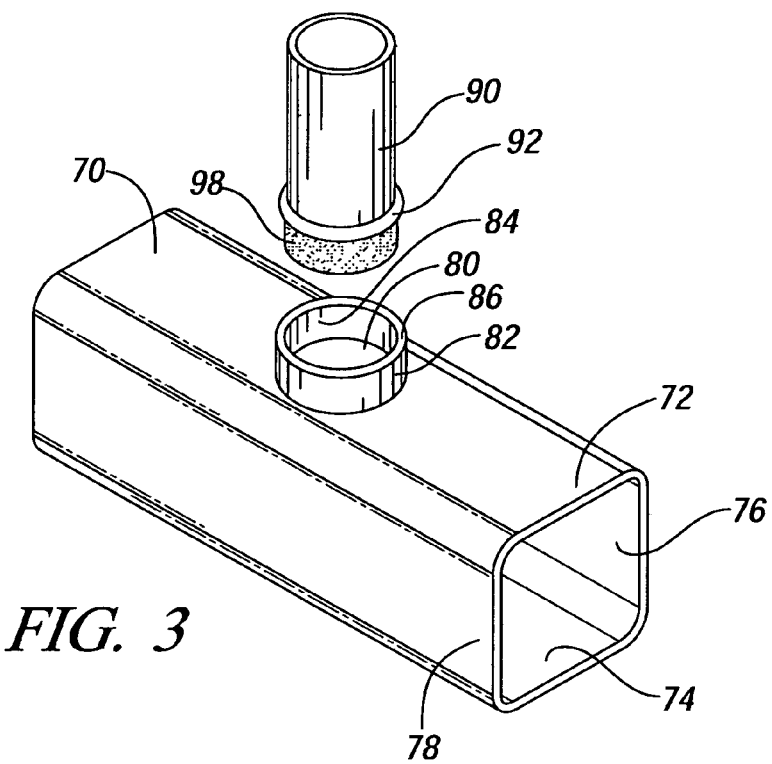
FIG. 3 is a view similar to FIG. 2 but showing adhesive applied to the outside of the smaller tube.
Figure 4:
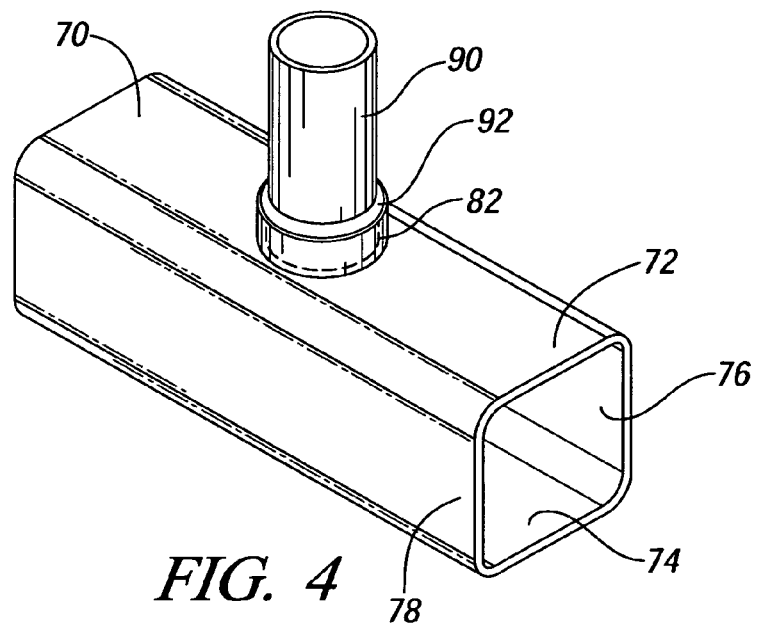
FIG. 4 is a view similar to FIG. 3 but showing that the smaller tube has been inserted into the flanged opening of the larger tube.

As seen in FIG. 3, adhesive 98 is applied onto the outer surface 94 of the small tube 90. Then, as shown in FIG. 4, the small tube 90 is inserted into the large tube 70, and the insertion is stopped by the engagement of the flange 92 of the small tube 90 with the end wall 86 of the flange 82 of the large tube 70.

Figure 5:
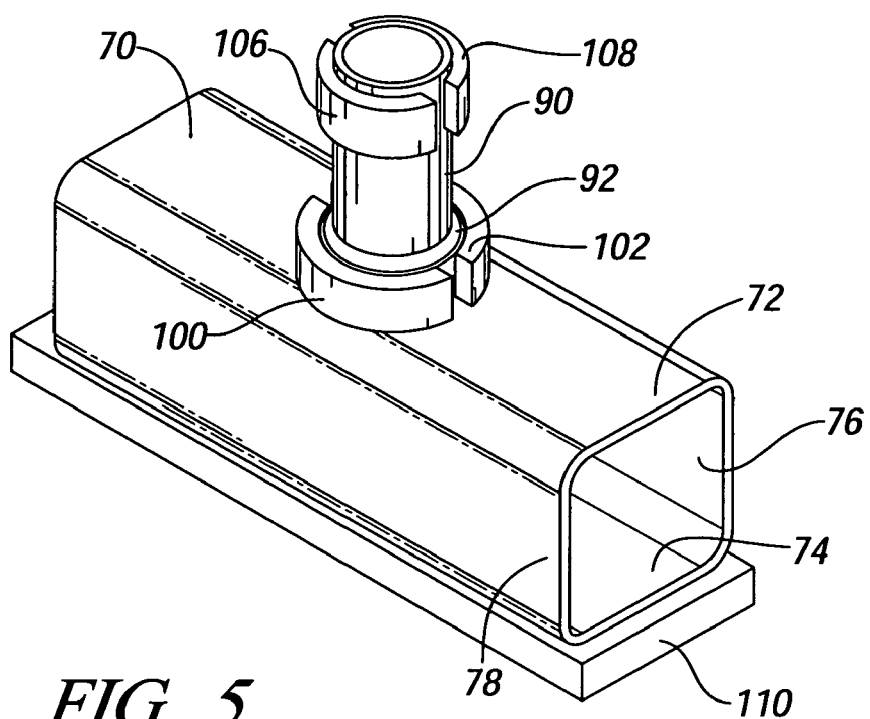
FIG. 5 is a view similar to FIG. 4 but showing clamping electrodes applied to the large tube and the small tube for accomplishing electrical resistance heating of the tube to cure the adhesive.

As shown in FIG. 5, a pair electrode clamps 100 and 102 is seated against the flange 82 of the large tube 70 and pressure is applied so that the flange 82 is compress tightly about the smaller tube 90. Another pair of electrode clamps 106 and 108 is seated against the outer surface of the small tube 90. And electrode 110 is placed beneath the large tube 70. Electrical current is applied to the electrodes and conducted between the tubes at the line of contact between the flange 92 of the small tube 90 and the end wall 86 of the flange 82 of the large tube 70, to thereby cause electrical resistance heating of the tubes in the region of the flange 82 and adhesive 98 to cure the adhesive. Further and final curing of the adhesive 98 may occur subsequently in an oven, for example, in the case of automobile manufacture, a paint curing oven.

In FIG. 6, another embodiment is shown in which the large tube 116 has a top wall 118 in which a hole 120 has tabs 122 and 124 formed on opposite sides of the hole 120. These tabs 122 and 124 and the hole 120 are formed by a piercing or lancing operation in which slugs of metal are bent from the top wall on opposite sides of the hole 120 to form the tabs 122 and 124.

The description of the invention is merely exemplary in nature and, thus, variations thereof are intended to be within the scope of the invention. For example, the tubes may be of round, square rectangular or other cross-section. One or the other of the tubes may have an open side, as with a C-shaped channel shape. Although the drawings show the example of a flange that extends outwardly from the top wall of the large channel, the flange can extend into the interior of the large tube. And although the drawings show the that the flange is continuous around its periphery, the flange of the large tube can be discontinuous, as for example would occur if the flange is formed by lancing a pair of tabs from the wall of the large tube. Likewise, although the drawing shows that the flange on the small tube is a continuous uninterrupted flange that completely encircles the small tube, the flange could be discontinuous as in the case of forming a plurality of dimples on the outer surface of the small tube to engage with the end wall of the flange of the large tube. In addition, although the drawing shows the T-joint as being at right angles, the tube may intersect at an acute angle.

What is claimed is:

1. A method of attaching together a larger tube and a smaller tube in a T-shaped intersecting joint, comprising:

providing aligned inlet and outlet holes in the opposing walls of the larger tube, said holes being formed to include flanged portions of the opposing walls that respectively surround the inlet and outlet holes, and said flanged portion of the outlet hole further having an inturned wall portion surrounding the outlet hole;

providing a circumferential extending flange on the outside of the smaller tube;

placing an adhesive on either the outside of the smaller tube or on the inside of the flanged portions of the larger tube;

inserting the smaller tube into the inlet hole in the larger tube and through the outlet hole of the larger tube hole so that the adhesive is interposed between the flanged portions of the larger tube and the outside of the smaller tube and so that the flange on the smaller tube comes into electrical conducting contact with the flange portion surrounding the inlet hole of the larger tube and the inturned wall portion of the flange portion surrounding the outlet hole of the larger tube comes into electrical conducting contact with the smaller tube;

and applying electrical current to flow between the large tube and the small tube so that electrical resistance heating is obtained to cure the adhesive.

2. The method of claim 1 in which the flanged portion of the large tube surrounding the inlet hole projects outwardly of the large tube.

3. The method of claim 1 in which the flanged portion of the large tube surrounding the inlet hole projects inwardly into the interior of the large tube.

4. The method of claim 1 in which the flanged portion of the large tube surrounding the outlet hole projects outwardly from the exterior of the large tube.

5. The method of claim 1 in which the flanged portion of the large tube surrounding the outlet hole projects inwardly into the interior to the large tube.

6. The method of claim 1 in which the adhesive is placed onto the outside of the small tube prior to the insertion of the small tube into the inlet and outlet holes of the large tube.

7. The method of claim 1 in which the adhesive is placed onto the inside of the flanged portions of the large tube prior to the insertion of the small tube into the inlet and outlet holes of the large tube.

8. The method of claim 1 in % which the adhesive is placed on the inside of the flanged portion surrounding the outlet hole and the adhesive is placed on the outside of the small tube adjacent to the flange of the small tube.

9. The method of claim 1 in which the adhesive is a preformed adhesive ring.

10. The method of claim 1 in which at least one of the flange portions on the larger tube is formed by lancing tabs from the wall of the outer tube so that the flange portion is discontinuous around the hole.

11. The method of claim 1 in which at least one of the flange portions on the larger tube is formed to be continuous around the hole.

12. The method of claim 1 in which the flange on the smaller tube is formed to be continuous around the circumference of the smaller tube.

13. The method of claim 1 in which the flange on the smaller tube is discontinuous around the circumference of the smaller tube.

14. The method of claim 1 in which electrical current is applied by electrodes that are applied to the small tube and large tube.

* * * * *